(12) United States Patent
Melack et al.

(10) Patent No.: US 10,593,920 B2
(45) Date of Patent: Mar. 17, 2020

(54) CAPACITANCE REDUCTION IN BATTERY SYSTEMS

(71) Applicant: Wisk Aero LLC, Mountain View, CA (US)

(72) Inventors: John Melack, Redwood City, CA (US); Thomas P. Muniz, Sunnyvale, CA (US); Nihal Murthy, San Francisco, CA (US); Sampson Lau, Mountain View, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/102,315

(22) Filed: Aug. 13, 2018

(65) Prior Publication Data

US 2020/0052256 A1 Feb. 13, 2020

(51) Int. Cl.
*H01M 2/10* (2006.01)
*H01M 10/6551* (2014.01)
*H01M 10/653* (2014.01)
*H01M 10/647* (2014.01)
*H01M 10/613* (2014.01)
*H02J 7/34* (2006.01)

(52) U.S. Cl.
CPC ....... *H01M 2/1077* (2013.01); *H01M 10/613* (2015.04); *H01M 10/647* (2015.04); *H01M 10/653* (2015.04); *H01M 10/6551* (2015.04); *H02J 7/345* (2013.01)

(58) Field of Classification Search
CPC ........... H01M 2/1077; H01M 10/6551; H01M 10/653; H01M 10/647; H01M 10/613; H01M 10/60; H01M 10/617; H01M 10/655; H01M 10/6555
See application file for complete search history.

(56) References Cited

U.S. PATENT DOCUMENTS

| 3,607,440 | A | | 9/1971 | Daniel et al. | |
| 4,137,376 | A | | 1/1979 | Clegg | |
| 5,354,630 | A | * | 10/1994 | Earl | H01M 2/0255 |
| | | | | | 429/101 |
| 5,438,100 | A | | 8/1995 | Shinozaki | |
| 5,670,272 | A | | 9/1997 | Cheu | |

(Continued)

FOREIGN PATENT DOCUMENTS

| CN | 202310441 | 7/2012 |
| JP | 0635540 | 5/1994 |

OTHER PUBLICATIONS

CN202310441U Google Machine translation printed Feb. 18, 2019.

(Continued)

*Primary Examiner* — Carlos Barcena
(74) *Attorney, Agent, or Firm* — Kilpatrick Townsend & Stockton LLP

(57) ABSTRACT

A battery system includes a battery cell, a thermally insulating layer, and a thermally conducting layer which includes a fin. The fin pushes against an interior surface of a case which surrounds the battery cell, the thermally insulating layer, and the thermally conducting layer. The thermally conducting layer includes a discontinuity where the discontinuity is configured to reduce a capacitance associated with the thermally conducting layer compared to when the thermally conducting layer does not include the discontinuity.

14 Claims, 8 Drawing Sheets

(56) References Cited

U.S. PATENT DOCUMENTS

| | | | |
|---|---|---|---|
| 6,087,036 A | 7/2000 | Rouillard et al. | |
| 6,372,377 B1 | 4/2002 | Ovshinsky | |
| 8,865,337 B2 | 10/2014 | Culver et al. | |
| 8,993,145 B2 | 3/2015 | Muniz | |
| 2005/0110458 A1 | 5/2005 | Seman, Jr. et al. | |
| 2005/0132562 A1 | 6/2005 | Saito | |
| 2005/0253553 A1 | 11/2005 | Phillips | |
| 2005/0269995 A1* | 12/2005 | Donnelly | B60L 3/0046 320/150 |
| 2006/0273758 A1* | 12/2006 | Sanada | H01M 2/0212 320/107 |
| 2008/0169788 A1 | 7/2008 | Bobbin et al. | |
| 2012/0003508 A1 | 1/2012 | Narbonne | |
| 2012/0009455 A1* | 1/2012 | Yoon | H01M 10/653 429/120 |
| 2013/0101890 A1 | 4/2013 | Ogg | |
| 2013/0130087 A1* | 5/2013 | Kawaguchi | H01M 2/1077 429/120 |
| 2013/0255293 A1 | 10/2013 | Gadawski | |
| 2013/0273400 A1 | 10/2013 | Musetti | |
| 2013/0316214 A1* | 11/2013 | Nagashima | H01M 2/0292 429/100 |
| 2014/0045024 A1 | 2/2014 | Waters | |
| 2014/0154535 A1* | 6/2014 | Olsson | H01M 2/1264 429/53 |
| 2014/0186683 A1 | 7/2014 | Tyler | |
| 2014/0227576 A1 | 8/2014 | Meintschel et al. | |
| 2014/0272494 A1 | 9/2014 | Silk et al. | |
| 2015/0037649 A1 | 2/2015 | Wyatt et al. | |
| 2015/0050535 A1 | 2/2015 | Amiruddin et al. | |
| 2015/0255826 A1 | 9/2015 | Turner, III | |
| 2015/0283965 A1 | 10/2015 | Lynds | |
| 2016/0079639 A1* | 3/2016 | Pinon | H01M 10/6556 429/120 |
| 2016/0093847 A1 | 3/2016 | Gunther | |
| 2016/0197385 A1* | 7/2016 | Matsumoto | H01G 2/08 429/120 |
| 2016/0218339 A1 | 7/2016 | Nishimori | |
| 2016/0336627 A1 | 11/2016 | Syed et al. | |
| 2017/0222284 A1 | 8/2017 | Ottomano | |
| 2018/0026296 A1 | 1/2018 | Kruger | |

OTHER PUBLICATIONS

JPH0635540 Google English Machine translation printed Feb. 18, 2019.

Meyer et al. [Meyer] (Home Power, vol. 119 Jun. and Jul. 2007 pp. 50-55).

U.S. Appl. No. 15/286,952, "Notice of Allowance", dated Aug. 23, 2019, 12 pages.

U.S. Appl. No. 16/438,963, "Non-Final Office Action", dated Aug. 13, 2019, 26 pages.

International Search Report and Written Opinion—PCT/US2018/049375—ISA/EPO—dated Nov. 30, 2018.

* cited by examiner

CAPACITANCE REDUCTION IN BATTERY SYSTEMS

BACKGROUND OF THE INVENTION

Some types of batteries are enclosed in a case with a sealed lid. This arrangement makes the removal of heat from the inside of the case difficult. Heat removal is an important aspect of a battery's design because some types of (battery) cells can emit large amounts of heat when they fail and this heat can cause nearby cells to fail, causing thermal runaway. To address this, new types of battery systems are being developed which include layers of thermal conductors (e.g., to draw heat out) interspersed amongst the cells. However, because some of the components and/or the arrangement of those components is/are new, there are unintentional and undesirable side effects. Techniques and/or components to mitigate such unintentional and undesirable side effects would be desirable.

BRIEF DESCRIPTION OF THE DRAWINGS

Various embodiments of the invention are disclosed in the following detailed description and the accompanying drawings.

DETAILED DESCRIPTION

Figure 1A:
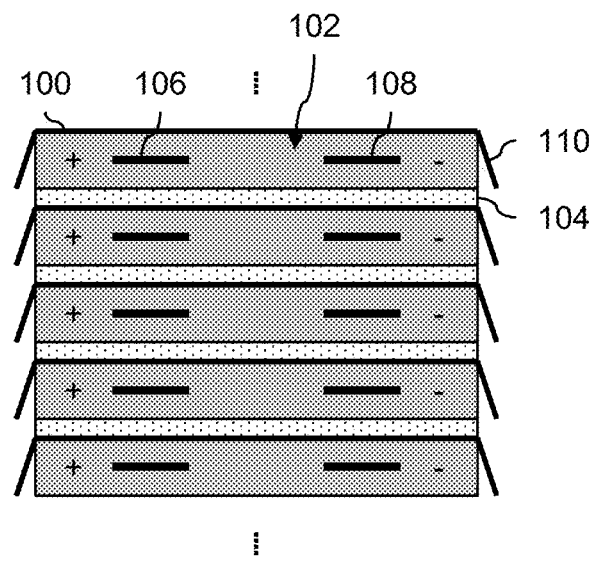
FIG. 1A is a top view of the stacked contents of a battery sub-module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a battery sub-module (or, more generally, a system) with better (e.g., lower) capacitance(s) are described herein. For example, such capacitances could be unintentional, resulting from a specific combination or arrangement of layers in a battery sub-module. These capacitances are undesirable because they negatively affect the electrical performance of the battery sub-module (e.g., when a load is being powered) and/or may store charge which is then discharged across someone handling the battery, possibly injuring that person.

In some embodiments, the system (e.g., a battery sub-module) includes a battery cell (e.g., a pouch cell), a thermally insulating layer (e.g., a layer of aerogel), and a thermally conducting layer (e.g., to draw heat out and away from other cells) which includes a (e.g., aluminum foil) fin where the fin is configured to push against an interior surface of a case which surrounds the battery cell, the thermally insulating layer, and the thermally conducting layer; the thermally conducting layer includes a discontinuity where the discontinuity is configured to reduce a capacitance associated with the thermally conducting layer compared to when the thermally conducting layer does not include the discontinuity. As will be described in more detail below, the thermally conducting layer (e.g., which is designed to draw out heat from a failing battery cell to prevent a nearby battery cell from overheating and failing as well) unintentionally creates a capacitance and to reduce this capacitance, one or more discontinuities (e.g., holes, openings, apertures, cutouts, etc.) are created in the thermally conducting layer to reduce the unintentionally-created capacitance.

First, it may be helpful to show the components described above. The following figure shows the stacked (e.g., layered) contents of a battery sub-module, including battery cells, thermally insulating layers, and thermally conducting layers.

FIG. 1A is a top view of the stacked contents of a battery sub-module. For clarity and readability, this drawing does not show the case which surrounds and compresses the stacked contents. In this example, the stacked content of the battery sub-module includes a repeated pattern which includes a thermally conducting layer with fins on both sides (100). As shown here, the thermally conducting layer includes three planar portions: a left fin, a right fin, and a portion which is in contact with the battery cell (102).

The purpose of the thermally conducting layer (100) is to act as a heat sink for the battery cell (102) which is in contact with that thermally conducting layer. By removing the heat produced by the battery cell (e.g., during normal operation and/or a catastrophic failure) from the interior of the stacked layers to the exterior, this prevents nearby battery cells from overheating and possibly failing.

Structurally, the fins are bendable and act like a spring and push back when pressure is applied. This enables the thermally conducting layer (e.g., via the fins) to make contact with the interior surface of the case (not shown) even if there is some (e.g., air) gap around the fin and/or variance in this distance. For example, even if the edges of the layers are not perfectly aligned and/or the layers have different widths, the thermally conducting layer is still able to make contact with the interior surface of the case. The thermally conducting layer is better able to conduct heat when the fin is in contact with the walls of the case (e.g., possible via some intervening material or substance), so having the fins act like a spring ensures that the fins always touch the case and are better able to bring heat out from the interior of the stacked contents shown. In some embodiments, the thermally conducting layer is made of metal (e.g., 1235 series Al) because metal is a good thermal conductor and also permits the fin to act like a spring.

The next layer in this example pattern is a battery cell (102). In this example, the battery cells are pouch cells. Pouch cells perform better when pressure is applied (e.g., ~3-5 PSI). More specifically, the cycle life of pouch cells can be extended by applying pressure to the pouch cells. For this reason, the stacked layers shown here are compressed using a metal case (not shown).

The next layer is a thermally insulating layer (104) and is sometimes referred to herein more simply as insulation. In this example, because the insulation (like all of the layers shown here) will be compressed, the insulation is made up of a material which can withstand (e.g., without collapsing) the expected pressure from the compressed can. For example, using the spring constant of a material as a metric of interest, the spring constant of the insulation should be non-negligible. In some embodiments, the insulation is made of aerogel which is a good thermal insulator and has a non-negligible spring constant.

Thermally, the layers of insulation prevent (or at least slow down and/or mitigate) heat from spreading from one cell to another cell. For example, suppose one cell fails catastrophically and in the process releases a large amount of heat. Without any insulation, all of that heat would propagate to nearby cells and cause those cells to also fail catastrophically. Eventually, all of the cells would fail catastrophically in a domino-like effect. This positive feedback cycle, domino-like effect (e.g., at the cell or battery level) is sometimes referred to as thermal runaway. The layers of insulation prevent (or at least slow down and/or mitigate) thermal runaway from happening (at least at the cell level).

This layering pattern repeats. In some embodiments, each battery sub-module includes 12 battery cells and a corresponding number of thermally insulating layers and thermally conducting layers. No specific beginning and ending to the stacking pattern is shown here and any appropriate beginning and ending layer(s) may be used. In some embodiments, the stacked layers begin and end with two layers of insulation.

The following figure shows a perspective view of the stacked contents of the battery sub-module, this time with the case.

Figure 1B:
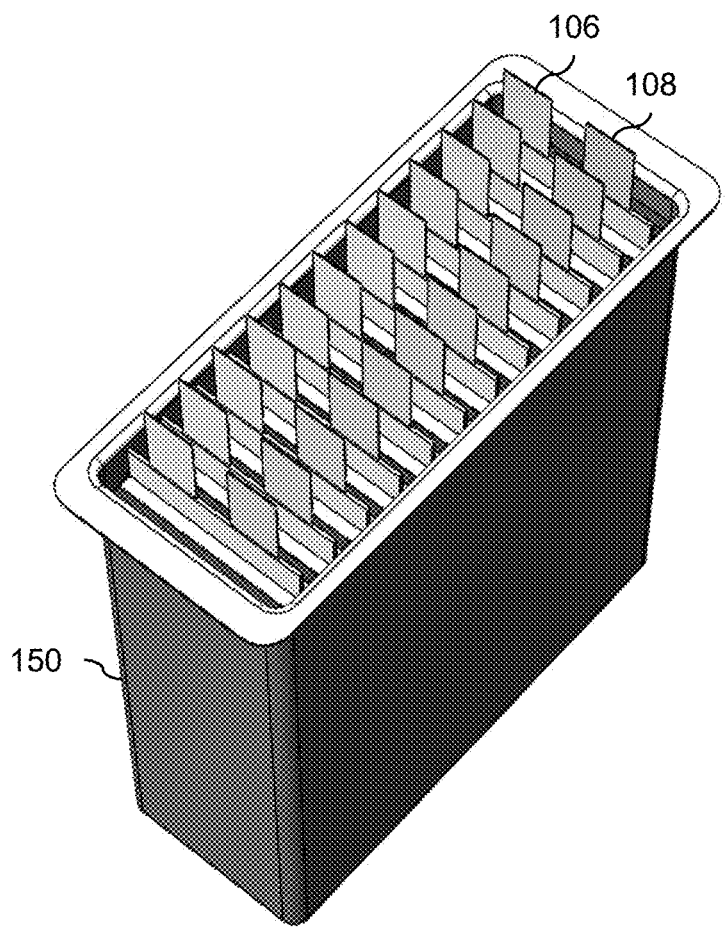
FIG. 1B is a perspective view of the stacked contents of a battery sub-module, including a case which compresses the contents of the case.

FIG. 1B is a perspective view of the stacked contents of a battery sub-module, including a case which compresses the contents of the case. From this view, the positive tab (106) and negative tab (108) can be seen extending upwards out of the case (150). The positive tabs and negative tabs are respectively connected to each other electrically (not shown) so that when the contents of the case are sealed with a lid, the lid exposes a single positive connection or port and a single negative connection or port.

Returning to FIG. 1A, earlier prototypes of the battery sub-module revealed that there was an unintended and/or unexpected capacitance between the thermally conducting layer (100) and the positive tab (106) and/or negative tab (108). This is due to the material used to make the thermally conducting layer (i.e., aluminum) in the prototypes. Aluminum is electrically conducting and so charge can build up on the thermally and electrically conducting layer (100). For example, each battery cell (102) has a positive tab (106), referred to more generally as a positive connector, and a negative tab (108), referred to more generally as a negative connector. Suppose that the (unintended) capacitance across a single tab and fin pair (e.g., positive tab (106) and right fin (110)) is 3 nF. Collectively, these individual capacitances add up to a non-negligible value. The following figures show an example of this.

Figure 2A:
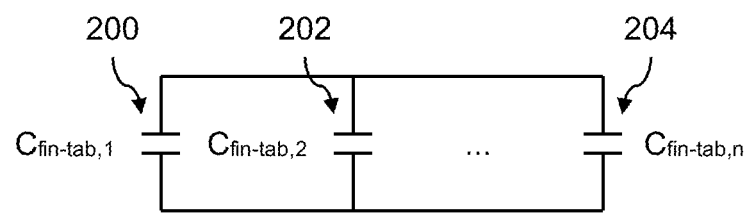
FIG. 2A is a diagram illustrating an embodiment of the capacitances across the fins and tabs of a battery sub-module.

FIG. 2A is a diagram illustrating an embodiment of the capacitances across the fins and tabs of a battery sub-module. In the example shown, capacitors 200, 202, and 204 represent the individual capacitances across each fin-tab pair (a shorter and more convenient name to refer to the capacitance across the tab of a battery cell and the fin of a thermally conducting layer) corresponding to the arrangement shown in FIG. 1A where there are n pairs of fins and tabs. For example, $C_{fin\text{-}tab,1}$ (200) is the capacitance across a first fin-tab pair, $C_{fin\text{-}tab,2}$ (202) is the capacitance across a second fin-tab pair, and so on where the capacitances are connected together in parallel. In one example, there are 12 fin-tab pairs in each battery sub-module and so there would be 12 capacitances connected together in parallel.

Electrically, these individual capacitances combine (e.g., additively) to create a large total or overall capacitance. The following figure shows an example of this.

Figure 2B:
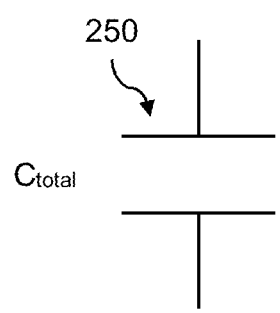
FIG. 2B is a diagram illustrating an embodiment of a total capacitance produced by combining smaller capacitances.

FIG. 2B is a diagram illustrating an embodiment of a total capacitance produced by combining smaller capacitances. In the example shown, the single total capacitance (250) shown here corresponds electrically to the circuit shown in FIG. 2A. If there are 12 fin-tab pairs and each individual capacitance across a single fin-tab pair is ~3 nF then the total capacitance (250) is ~36 nF. In at least some applications, this is a non-negligible total capacitance.

In one example application, multiple battery sub-modules are (further) combined together into larger battery units or systems and are used to power an all-electric vehicle, such as an aircraft. This is how the earlier prototypes were used. In the example aircraft application, the larger battery units or systems (e.g., produced by combining multiple battery sub-modules) supplied voltages on the order of 600V (e.g., because the propulsion system of the aircraft requires such a high voltage). This combination of high voltages and non-negligible (albeit unintentional) capacitances can be dangerous for workers who handle the batteries because they could be seriously hurt or even killed if high-voltage charge builds up on these unintentional capacitances and then discharges through the worker. The unintentional capacitances also affect the electrical performance of the system. For this reason, it is desirable to reduce the unintentional capacitances created by the thermally conducting layer.

The following figures show some examples of a thermally conducting layer with one or more discontinuities to reduce an unintentional capacitance produced by that thermally conducting layer.

Figure 3A:
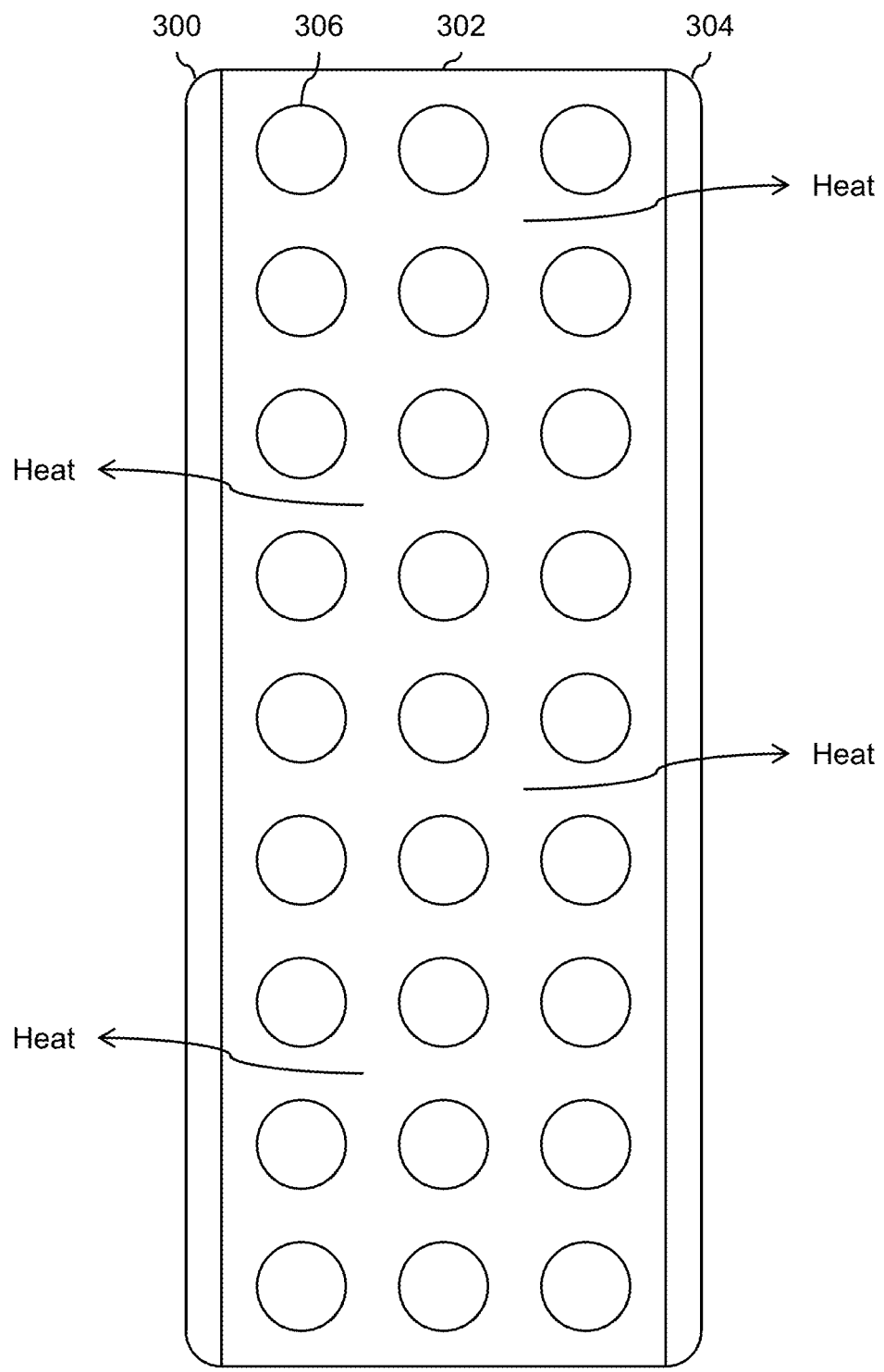
FIG. 3A is a diagram illustrating an embodiment of a thermally conducting layer with circular discontinuities.

FIG. 3A is a diagram illustrating an embodiment of a thermally conducting layer with circular discontinuities. In the example shown, the thermally conducting layer has three planar portions: a left fin (300), a portion which is in contact with the battery cell (302), and a right fin (304). In this particular example, the part of the thermally conducting layer that is flush with the battery cell (302) has a plurality of circular discontinuities (306). Capacitance is reduced by reducing the surface area of the part of the fin that is in contact with the cell surface (302). Discontinuities in the left fin (300) and right fin (304) do not meaningfully change the capacitance of the tabs to the fin and therefore are not shown in this example. It is noted that the shapes, sizes, numbers, and/or placements of the discontinuities described herein are merely exemplary are not intended to be limiting.

The discontinuities (306) reduce a capacitance associated with the thermally conducting layer compared to when the thermally conducting layer does not include the discontinuity. The discontinuities do this by reducing the surface area of the thermally conducting layer in close proximity to the cell which in turn reduces the capacitance produced by the exemplary thermally conducting layer (e.g., between the thermally conducting layer and a battery cell). For example, this means that each of the individual capacitances ($C_{fin-tab,1}$) shown in FIG. 2A have smaller values and correspondingly the total capacitance ($C_{total}$) shown in FIG. 2B is also smaller. The number and/or placement of the discontinuities may be adjusted to adjust the capacitance as desired. Generally speaking, the more the discontinuities reduce the surface area of the thermally conducting layer, the more the capacitance will decrease.

Thermally, the discontinuities do not significantly affect the ability of the thermally conducting layer shown to draw heat out of the center of the stacked layers to the edges of the stacked layers and subsequently out via the case (not shown). Naturally, the shape, number, and/or placement of the discontinuities may be adjusted to find an acceptable tradeoff between thermal conductivity and reduced capacitance. As an example, the following figure shows another embodiment of a thermally conducting layer.

Figure 3B:
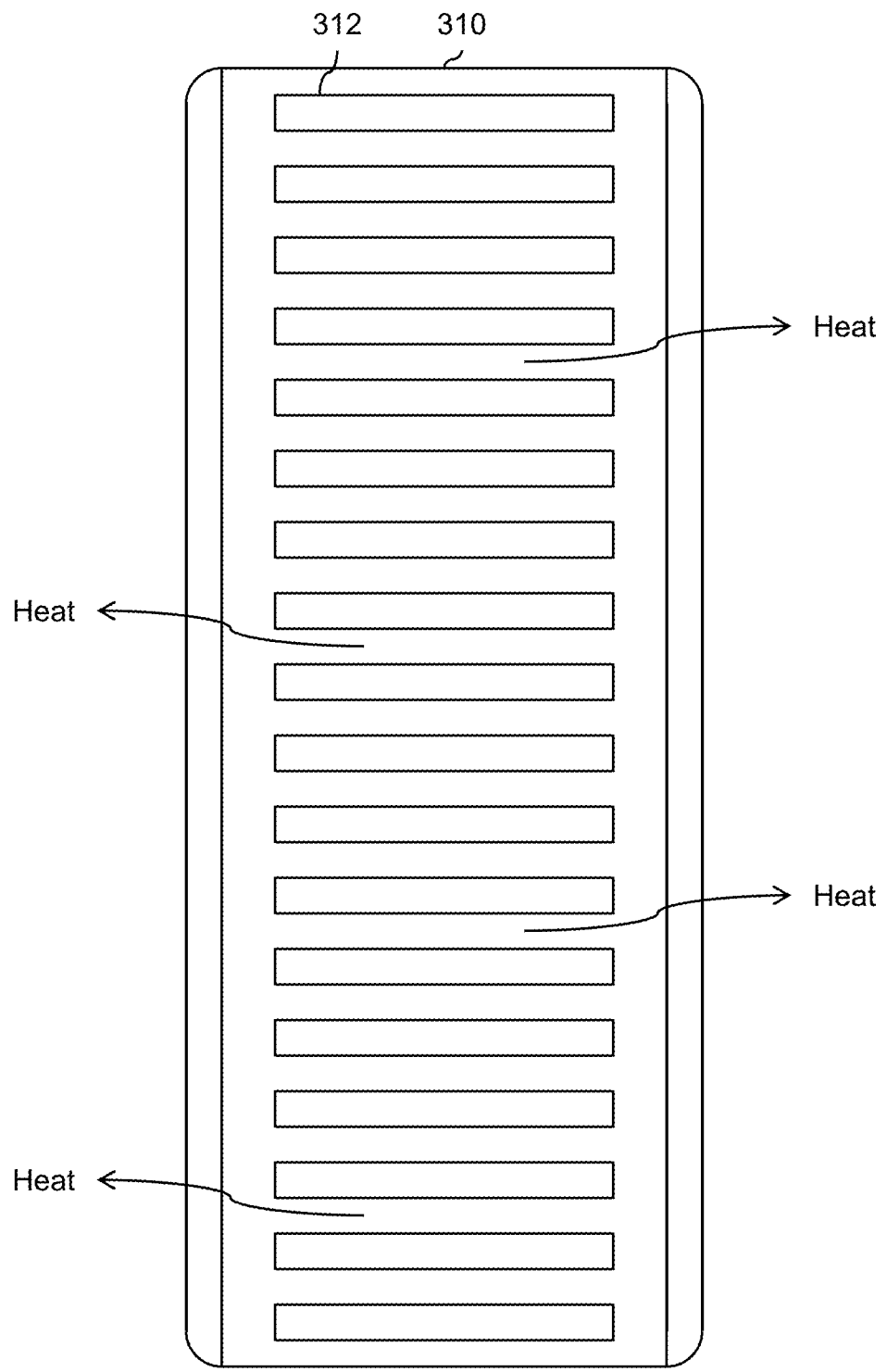
FIG. 3B is a diagram illustrating an embodiment of a thermally conducting layer with rectangular discontinuities on the portion in contact with the battery cell.

FIG. 3B is a diagram illustrating an embodiment of a thermally conducting layer with rectangular discontinuities on the portion in contact with the battery cell. In this example, the planar part of the thermally conducting layer that is flush with the battery cell (310) has rectangular discontinuities (312) which extend from near the shared edge with the left fin towards the shared edge with the right fin. In some embodiments, this is attractive because it creates (e.g., horizontal) thermal channels or corridors via which the heat can be drawn out of the interior of the stacked layers towards the fins. Another way of describing this shape and layout is to say that the discontinuities on that surface have a first distal end pointing towards the left fin and a second distal end pointing towards the right fin.

Although vertical thermal channels which extend towards the top edge and bottom edge could be created using discontinuities, this may not be as effective as the horizontal thermal channels shown here because the top edge and bottom edge do not have fins which guarantee contact with the interior surface of the case (not shown). The spring-like nature of the left fin and right fin ensures that the fins make contact with the case, even if there is some variation in the space or gap between the case and the left edge and/or fin and right edge and/or fin.

The following figures show a process for providing a battery sub-module with improved (e.g., reduced) capacitance.

Figure 4:
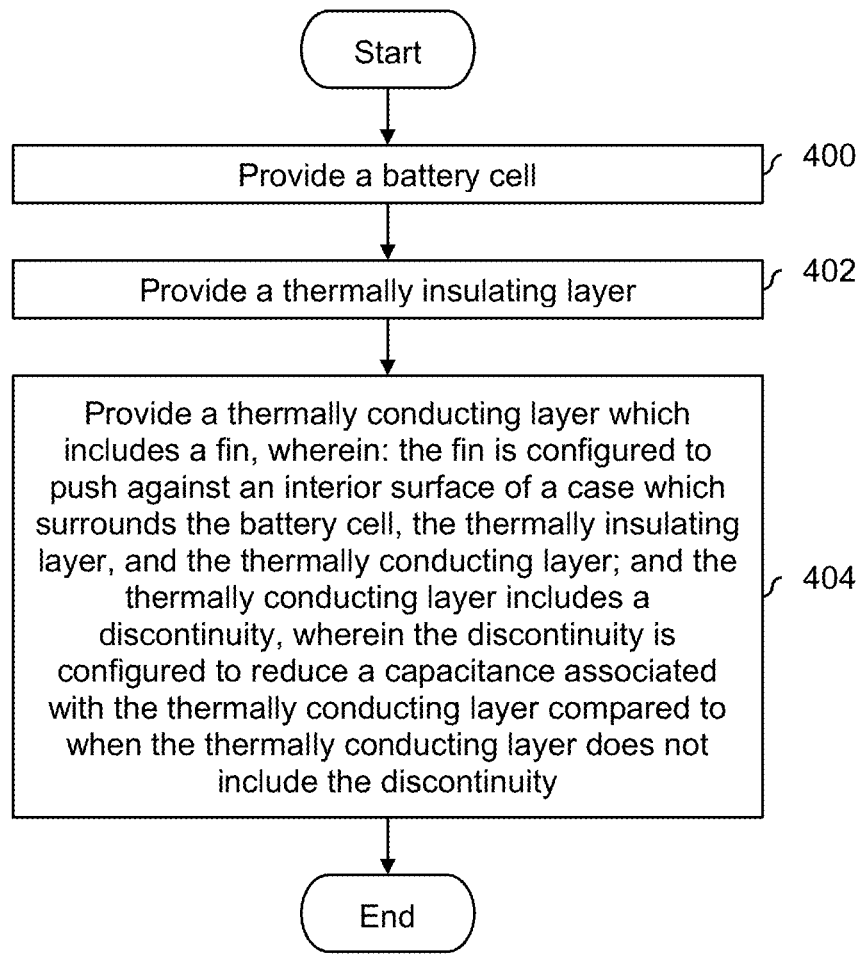
FIG. 4 is a flowchart illustrating an embodiment of a process to provide a battery sub-module with reduced capacitance.

FIG. 4 is a flowchart illustrating an embodiment of a process to provide a battery sub-module with reduced capacitance. In some embodiments, the process is performed by and/or using the devices shown in FIGS. 1A-1B and 3A-3B.

At 400, a battery cell is provided. See, for example, the battery cells 102 in FIG. 1A.

At 402, a thermally insulating layer is provided. See, for example, the layers of thermal insulation (104) in FIG. 1A. As described above, these layers of insulation prevent (or at least mitigate) the transfer of heat from one battery cell to another battery cell. As described above, a failing battery cell may produce large amounts of heat, and the layers of thermal insulation prevent (or at least mitigate) other battery cells from overheating which could cause those batteries to fail and which in turn could cause still more battery cells to fail, resulting in a cascading failure scenario (i.e., thermal runaway).

At 404, a thermally conducting layer which includes a fin is provided, wherein: the fin is configured to push against an interior surface of a case which surrounds the battery cell, the thermally insulating layer, and the thermally conducting layer; and the thermally conducting layer includes a discontinuity, wherein the discontinuity is configured to reduce a capacitance associated with the thermally conducting layer compared to when the thermally conducting layer does not include the discontinuity. See, for example, FIG. 1A which shows a top view of the stacked layers, including the fins (100) which push against the case (see case 150 in FIG. 1B). See also discontinuities 306 in FIG. 3A and discontinuities 312 in FIG. 3B.

In some embodiments, other features and/or techniques are used to reduce capacitance (e.g., at any scope or level, such as at the thermally conducting layer, at the sub-module level, at the battery system or module level, etc.). The following figures show some examples of other capacitance reduction techniques and/or features. Naturally, these techniques and/or features may be used in any combination, including combinations which are not specifically described herein.

Figure 5A:
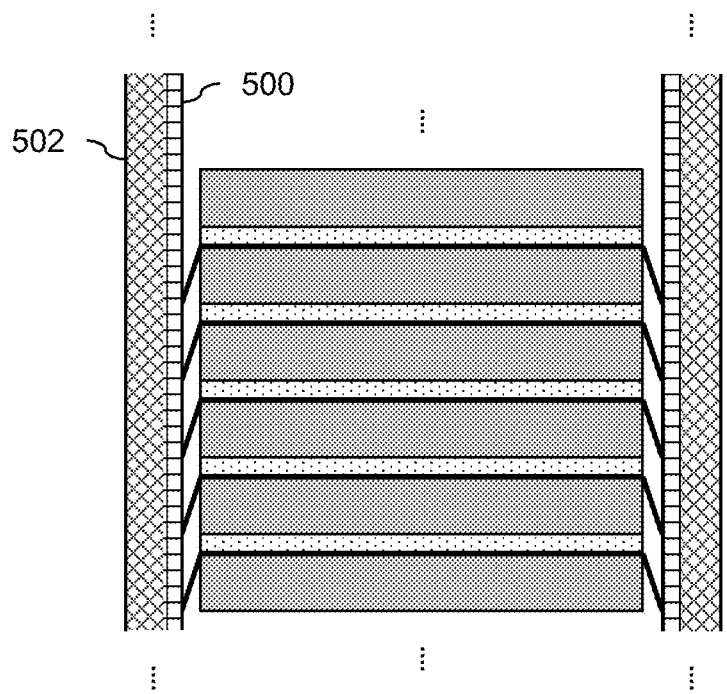
FIG. 5A is a top view of the stacked contents of a battery sub-module where the interior surface of the case is anodized to create an electrically insulating surface.

FIG. 5A is a top view of the stacked contents of a battery sub-module where the interior surface of the case is anodized to create an electrically insulating surface. In this example, the interior surface (500) of the case has been anodized. In this example, the anodization process has only been applied to the inside of the case so the exterior-facing part of the case (502) is not anodized. In other embodiments, the entire aluminum can may be anodized. The case is made of aluminum in this example and anodizing aluminum increases the electrical insulation. As such, the interior surface has better electrical insulation than before anodization occurred.

The electrically insulating interior surface of the case increases the electrical insulation between fins (e.g., a first fin on the left side and second fin on the left side). This has the effect of "breaking up" the parallel arrangement of capacitors shown in FIG. 2A so that they are no longer in a parallel arrangement, at least electrically. As a result of the new, non-parallel electrical arrangement, the corresponding combined or total capacitance is reduced. For example, instead of producing a total capacitance of 12×3 pF=36 pF, it is a smaller value. As described above, reducing the capacitance is desirable.

It is noted that the battery sub-module still needs to bring heat out from inside the case (e.g., from the stacked layers in the core of the battery sub-module). As such, the anodized interior surface (or any other electrical insulation serving this purpose) should not interfere substantially with the removal of heat from the battery sub-module. For example, a thermal conductivity decrease on the order of 20% (e.g., in the range of 18%-22%) would be acceptable.

In this example, the electrical insulation is achieved by anodizing the interior surface of the case. However, the electrical insulation can be added using a variety of techniques. The following figures show some other examples.

Figure 5B:
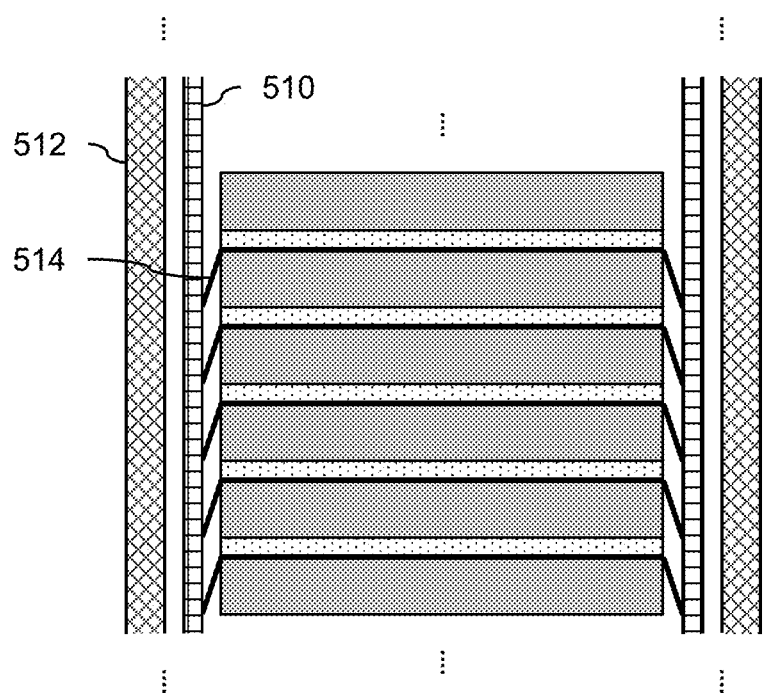
FIG. 5B is a top view of the stacked contents of a battery sub-module where a layer of electrical insulation is placed between the case and the fins.

FIG. 5B is a top view of the stacked contents of a battery sub-module where a layer of electrical insulation is placed between the case and the fins. In this example, a layer of electrical insulation (510) is placed between the case (512) and the fins (514). This may be performed in a number of ways. If the electrical insulation is "floppy" and cannot stand on its own (e.g., it is not sufficiently stiff), the stacked contents may be first bundled together and then wrapped with the layer of electrical insulation. The wrapped contents with the "wrapper" of insulation can then be inserted into the can.

Alternatively, if the electrical insulation can stand on its own, the layer of insulation may be placed into the case first, and then the stacked layers are inserted into the case. These are some examples and are not intended to be limiting. As before, the material used for the electrical insulation (510) is selected so that it does not significantly interfere with the removal of heat.

Figure 5C:
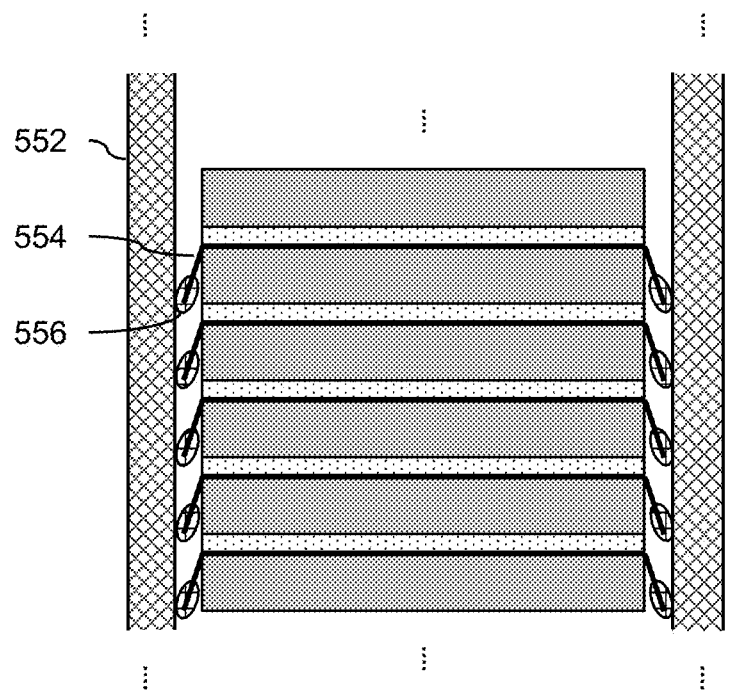
FIG. 5C is a top view of the stacked contents of a battery sub-module where the tips of the fins are treated so that they are electrically insulating.

FIG. 5C is a top view of the stacked contents of a battery sub-module where the tips of the fins are treated so that they are electrically insulating. In this example, instead of electrically insulating the interior surface of the case (552), the tips of the fins (554) are treated, coated, or otherwise processed so that they have a layer of electrical insulation (556). In some embodiments, an electrically insulating compound, (e.g., thermal) grease (e.g., which includes polymeric matrix and a metal-oxide filler), resin, or adhesive is deposited on the tips of the fins. Alternatively, the fins (especially the tips) are anodized. As before, the deposited material or processing technique used does not substantially increase the thermal insulation.

A more general way of describing the embodiments described above is to say that a path (e.g., electrical and/or thermal) which includes one of the fins and the case includes an insulator that increases electrical insulation and does not substantially increase thermal insulation. As shown above, this (e.g., electrical but not thermal) insulation may be inserted or otherwise implemented using a variety of techniques, including by being formed by anodizing the interior surface of the case, a layer of insulating material between fin and the case, a layer of insulating material deposited on at least a tip of the fin, being formed by anodizing at least a tip of the fin, etc.

In some embodiments, battery assembly techniques may dictate which is the more attractive embodiment. For example, if the assembly technique does not include compressing the fins while the stacked layers are inserted into the case, then the embodiments shown in FIG. 5A or FIG. 5C may be more attractive. This is because the separate layer of electrical insulation between the case and the fins may get caught on the case and/or fins when they are being pushed together. However, if the fins are compressed during inser-tion, then this may not be a problem. To put this more generally, a variety of considerations (e.g., cost, battery assembly technique, the tradeoff between improved/increased electrical insulation and degraded/decreased thermal insulation for a given material or processing technique, etc.) may be considered in selecting the appropriate embodiment.

As described above, in some embodiments, multiple battery sub-modules are combined together to form a larger, high-voltage battery system. The following figure shows an example of this and how an associated capacitance can be reduced.

Figure 6:
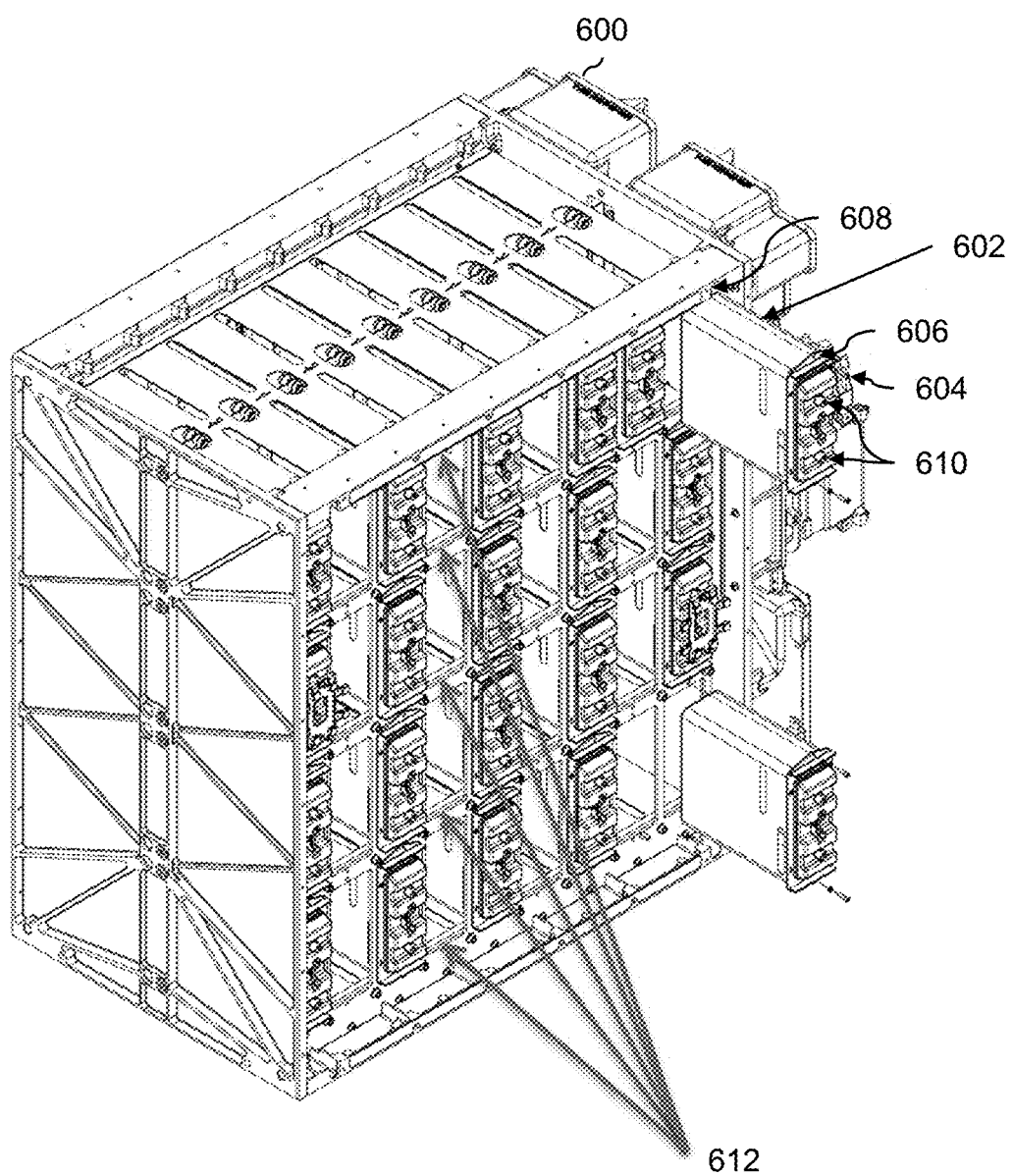
FIG. 6 is a diagram illustrating an embodiment of a frame which is used to hold multiple battery sub-modules.

FIG. 6 is a diagram illustrating an embodiment of a frame which is used to hold multiple battery sub-modules. As described above, in one example application, multiple battery sub-modules (e.g., each of which outputs a voltage on the order of 15V) are combined together to generate a high voltage supply (e.g., on the order of 600V) to power high-voltage loads, such as lift fans. To do this, the exemplary frame (600) is used. The frame has two accessible sides into which battery sub-modules (602) are inserted and held in a detachably coupled manner: the side shown here and the opposite side.

To secure each of the battery sub-modules to the frame, two screws (604) are inserted through holes in the case (606): one at the top of the case and one at the bottom of the case. The screws then go through holes in the frame (608) to secure the battery sub-module to the frame.

In the example shown, the battery sub-modules have their lids on. The lids have two output connectors or ports for the power supply (610), one positive and the other negative. These power supply connectors are connected together using cables and/or electronics which are not shown in this diagram so as not to obstruct the components shown. For example, these cables and/or electronics are coupled to the lids and/or face the open side shown here.

In this example, because the frame is made of an electrically conductive material, as are the cases, this leads to the undesirable addition of parallel sub-module capacitances, similar to how a conductive sub-module case can lead to the undesirable addition of parallel cell-to-fin capacitances (see FIG. 2A and FIG. 2B). With the battery sub-modules screwed into the frame, the combine together in an undesirable manner. Similar to the smaller-scale examples described above, this creates a capacitance which can shock workers and/or interfere with the electrical performance of the system.

To reduce the capacitance, in some embodiments, the frame has electrically independent shear panel rails (612) which better isolate (e.g., electrically) the battery sub-modules from each other. This acts to prevent the capacitance of each rail from adding together (or least combines them in a manner that produces a smaller value).

A more general way to describe this is to say that a frame which is configured to hold a first battery sub-module and a second battery sub-module includes an insulating portion that is configured to increase electrical insulation between the first battery sub-module and the second battery sub-module. In this example, this is done by making the shear panels (which make contact with the cases of the battery sub-modules) with electrically insulating and/or non-conductive material. In some embodiments, the shear panel is coated or processed to produce the electrical insulation.

Unlike the previous examples, heat transfer is not as much of a concern here and so the insulation between battery sub-modules can affect thermal conductivity. This is because the frame is not the primary thermal pathway via which heat from the battery sub-modules is dissipated. In contrast, with some of the examples of above, primary thermal pathways could be affected and so material and/or techniques are selected accordingly (i.e., to not substantially impede the removal of heat from the interior of the battery sub-modules).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a battery cell;
  a thermally insulating layer; and
  a thermally conducting layer which includes a fin, wherein:
    the fin is configured to push against an interior surface that is anodized of a case which surrounds the battery cell, the thermally insulating layer, and the thermally conducting layer; and
    the thermally conducting layer includes a discontinuity, wherein:
      the discontinuity is configured to reduce an individual capacitance associated with the thermally conducting layer compared to when the thermally conducting layer does not include the discontinuity;
      the individual capacitance contributes to a combined capacitance that is observable from an exterior of the case, including when the thermally conducting layer is sealed inside of the case with a lid, such that the combined capacitance that is observable from the exterior of the case is reduced when the thermally conducting layer includes the discontinuity compared to when the thermally conducting layer does not include the discontinuity; and
      one or more of the following:
        a) the anodization of the interior surface of the case increases an electrical insulation associated with the interior surface of the case, such that the combined capacitance that is observable from the exterior of the case is further reduced when the interior surface of the case is anodized compared to when the interior surface of the case is not anodized, the exterior of the case not being anodized, wherein the anodization of the interior surface of the case decreases a thermal conductivity of the case by 22% or less;
        b) a path which includes the fin and the case includes an insulator that increases electrical insulation and does not substantially decrease thermal conductivity such that any change in thermal conductivity is within 22%, inclusive; and
          the insulator that increases electrical insulation and does not substantially decrease thermal conductivity such that any change in thermal conductivity is within 22%, inclusive, includes a layer of insulating material between the fin and the case, the insulator being separate from the fin and the case; or
        c) a path which includes the fin and the case includes an insulator that increases electrical insulation and does not substantially decrease thermal conductivity such that any change in thermal conductivity is within 22%, inclusive; and
          the insulator that increases electrical insulation and does not substantially decrease thermal conductivity such that any change in thermal conductivity is within 22%, inclusive, includes a layer of insulating material deposited on at least a tip of the fin, the layer of insulating material including grease, thermal grease, polymeric matrix, metal-oxide filler, resin, or adhesive.

2. The system recited in claim 1, wherein:
  the thermally conducting layer includes a plurality of planar portions, including the fin and a portion which is in contact with the battery cell; and
  the portion which is in contact with the battery cell includes the discontinuity.

3. The system recited in claim 1, wherein:
  the thermally conducting layer includes a plurality of planar portions, including a left fin, a right fin, and a portion which is in contact with the battery cell;
  the portion which is in contact with the battery cell includes the discontinuity; and
  the discontinuity has a first distal end pointing towards the left fin and a second distal end pointing towards the right fin.

4. The system recited in claim 1, wherein:
  the insulator that increases electrical insulation and does not substantially decrease thermal conductivity such that any change in thermal conductivity is within 22%, inclusive, is formed by anodizing at least a tip of the fin.

5. The system recited in claim 1, further comprising:
  a first battery sub-module that includes the case, the battery cell, the thermally insulating layer, and the thermally conducting layer;
  a second battery sub-module that includes a second case, a second battery cell, a second thermally insulating layer, and a second thermally conducting layer; and
  a frame which is configured to hold the first battery sub-module and the second battery sub-module, wherein:
    the frame includes a first shear panel rail to which the first battery sub-module is removably attached and a second shear panel rail to which the second battery sub-module is removably attached, wherein the first shear panel rail and the second shear panel rail are electrically independent of each other; and
    the first battery sub-module, the second battery sub-module, and the frame are included in a high voltage supply system that outputs a voltage of 600V.

6. The system recited in claim 1, wherein the anodization of the interior surface of the case increases an electrical insulation associated with the interior surface of the case, such that the combined capacitance that is observable from the exterior of the case is further reduced when the interior surface of the case is anodized compared to when the interior surface of the case is not anodized, the exterior of the case not being anodized.

7. The system recited in claim 1, wherein:
  a path which includes the fin and the case includes an insulator that increases electrical insulation and does not substantially decrease thermal conductivity such that any change in thermal conductivity is within 22%, inclusive; and
  the insulator that increases electrical insulation and does not substantially decrease thermal conductivity such that any change in thermal conductivity is within 22%, inclusive, includes a layer of insulating material between the fin and the case, the insulator being separate from the fin and the case.

8. The system recited in claim 1, wherein:
a path which includes the fin and the case includes an insulator that increases electrical insulation and does not substantially decrease thermal conductivity such that any change in thermal conductivity is within 22%, inclusive; and
the insulator that increases electrical insulation and does not substantially decrease thermal conductivity such that any change in thermal conductivity is within 22%, inclusive, includes a layer of insulating material deposited on at least a tip of the fin, the layer of insulating material including grease, thermal grease, polymeric matrix, metal-oxide filler, resin, or adhesive.

9. A method, comprising:
providing a battery cell;
providing a thermally insulating layer; and
providing a thermally conducting layer which includes a fin, wherein:
  the fin is configured to push against an interior surface that is anodized of a case which surrounds the battery cell, the thermally insulating layer, and the thermally conducting layer; and
  the thermally conducting layer includes a discontinuity, wherein:
    the discontinuity is configured to reduce an individual capacitance associated with the thermally conducting layer compared to when the thermally conducting layer does not include the discontinuity;
    the individual capacitance contributes to a combined capacitance that is observable from an exterior of the case, including when the thermally conducting layer is sealed inside of the case with a lid, such that the combined capacitance that is observable from the exterior of the case is reduced when the thermally conducting layer includes the discontinuity compared to when the thermally conducting layer does not include the discontinuity; and
    one or more of the following:
      a) the anodization of the interior surface of the case increases an electrical insulation associated with the interior surface of the case, such that the combined capacitance that is observable from the exterior of the case is further reduced when the interior surface of the case is anodized compared to when the interior surface of the case is not anodized, the exterior of the case not being anodized, wherein the anodization of the interior surface of the case decreases a thermal conductivity of the case by 22% or less;
      b) a path which includes the fin and the case includes an insulator that increases electrical insulation and does not substantially decrease thermal conductivity such that any change in thermal conductivity is within 22%, inclusive; and
        the insulator that increases electrical insulation and does not substantially decrease thermal conductivity such that any change in thermal conductivity is within 22%, inclusive, includes a layer of insulating material between the fin and the case, the insulator being separate from the fin and the case; or
      c) a path which includes the fin and the case includes an insulator that increases electrical insulation and does not substantially decrease thermal conductivity such that any change in thermal conductivity is within 22%, inclusive; and
        the insulator that increases electrical insulation and does not substantially decrease thermal conductivity such that any change in thermal conductivity is within 22%, inclusive, includes a layer of insulating material deposited on at least a tip of the fin, the layer of insulating material including grease, thermal grease, polymeric matrix, metal-oxide filler, resin, or adhesive.

10. The method recited in claim 9, wherein:
the thermally conducting layer includes a plurality of planar portions, including the fin and a portion which is in contact with the battery cell; and
the portion which is in contact with the battery cell includes the discontinuity.

11. The method recited in claim 9, wherein:
the thermally conducting layer includes a plurality of planar portions, including a left fin, a right fin, and a portion which is in contact with the battery cell;
the portion which is in contact with the battery cell includes the discontinuity; and
the discontinuity has a first distal end pointing towards the left fin and a second distal end pointing towards the right fin.

12. The method recited in claim 9, wherein:
the insulator that increases electrical insulation and does not substantially decrease thermal conductivity such that any change in thermal conductivity is within 22%, inclusive, is formed by anodizing at least a tip of the fin.

13. The method recited in claim 9, wherein:
a first battery sub-module includes the case, the battery cell, the thermally insulating layer, and the thermally conducting layer;
a second battery sub-module includes a second case, a second battery cell, a second thermally insulating layer, and a second thermally conducting layer; and
a frame is configured to hold the first battery sub-module and the second battery sub-module, wherein:
  the frame includes a first shear panel rail to which the first battery sub-module is removably attached and a second shear panel rail to which the second battery sub-module is removably attached, wherein the first shear panel rail and the second shear panel rail are electrically independent of each other; and
  the first battery sub-module, the second battery sub-module, and the frame are included in a high voltage supply system that outputs a voltage of 600V.

14. A system, comprising:
a battery cell;
a thermally insulating layer; and
a thermally conducting layer which includes a fin, wherein:
  the fin is configured to push against an interior surface a case which surrounds the battery cell, the thermally insulating layer, and the thermally conducting layer; and
one or more of the following:
  a) a path which includes the fin and the case includes an insulator that increases electrical insulation and does not substantially decrease thermal conductivity such that any change in thermal conductivity is within 22%, inclusive; and
    the insulator that increases electrical insulation and does not substantially decrease thermal conductivity such that any change in thermal conductivity is within 22%, inclusive, includes a layer of insulating material between the fin and the case, the insulator being separate from the fin and the case; or
b) a path which includes the fin and the case includes an insulator that increases electrical insulation and does not substantially decrease thermal conductivity such that any change in thermal conductivity is within 22%, inclusive; and the insulator that increases electrical insulation and does not substantially decrease thermal conductivity such that any change in thermal conductivity is within 22%, inclusive, includes a layer of insulating material deposited on at least a tip of the fin, the layer of insulating material including grease, thermal grease, polymeric matrix, metal-oxide filler, resin, or adhesive, wherein the insulator that increases electrical insulation and does not substantially decrease thermal conductivity such that any change in thermal conductivity is within 22%, inclusive, is formed by anodizing at least a tip of the fin.

* * * * *